United States Patent
Borlick et al.

(10) Patent No.: US 11,119,662 B2
(45) Date of Patent: Sep. 14, 2021

(54) DETERMINING WHEN TO PERFORM A DATA INTEGRITY CHECK OF COPIES OF A DATA SET USING A MACHINE LEARNING MODULE

(71) Applicant: International Business Machines Corporation, Armonk, NY (US)

(72) Inventors: Matthew G. Borlick, Tucson, AZ (US); Karl A. Nielsen, Tucson, AZ (US); Clint A. Hardy, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/023,456

(22) Filed: Jun. 29, 2018

(65) Prior Publication Data

US 2020/0004437 A1    Jan. 2, 2020

(51) Int. Cl.
*G06F 3/06* (2006.01)
*G06N 20/00* (2019.01)

(52) U.S. Cl.
CPC ............ *G06F 3/0619* (2013.01); *G06F 3/065* (2013.01); *G06F 3/0683* (2013.01); *G06N 20/00* (2019.01)

(58) Field of Classification Search
CPC ...... G06F 3/0619; G06F 3/065; G06F 3/0683; G06N 20/00
See application file for complete search history.

(56) References Cited

U.S. PATENT DOCUMENTS

| 6,745,303 | B2 * | 6/2004 | Watanabe ........... G06F 11/2058 707/999.01 |
| 6,981,070 | B1 | 12/2005 | Luk et al. |
| 6,986,075 | B2 | 1/2006 | Ackaret et al. |
| 7,236,911 | B1 | 6/2007 | Gough et al. |

(Continued)

FOREIGN PATENT DOCUMENTS

CN   108108810 A   6/2018

OTHER PUBLICATIONS

Anonymously, "Method for Self-Scrubbing ECC for Set-Associative Cache"; dated Feb. 13, 2007, An IP.com Prior Art Database Technical Disclosure, (online), retrieved from the Internet at URL>http://ip.com/IPCOM/000146495D, Total 4 pages.

(Continued)

*Primary Examiner* — Hiep T Nguyen
(74) *Attorney, Agent, or Firm* — Konrad Raynes Davda & Victor LLP; David W. Victor

(57) ABSTRACT

Provided are a computer program product, system, and method for using a machine learning module to determine when to perform a data integrity check of copies of a data set. Input on storage attributes of a plurality of storage units, each storage unit of the storage units storing a copy of a data set, is provided to a machine learning module to produce an output value. A determination is made as to whether the output value indicates to perform a data integrity check of the copies of the data set. A determination is made as to whether the copies of the data set on different storage units are inconsistent in response to determining to perform the data integrity check. At least one of the copies of the data set is corrected to synchronize all the copies of the data set.

27 Claims, 9 Drawing Sheets

(56) References Cited

U.S. PATENT DOCUMENTS

| | | | |
|---|---|---|---|
| 7,890,815 | B2 | 2/2011 | Hafner et al. |
| 8,327,250 | B1 | 12/2012 | Goel |
| 8,351,289 | B1 | 1/2013 | Brand et al. |
| 8,468,244 | B2 | 6/2013 | Redlich et al. |
| 9,558,068 | B1* | 1/2017 | Bono .................. G06F 16/17 |
| 9,621,421 | B1 | 4/2017 | Tolentino et al. |
| 9,678,817 | B1 | 6/2017 | Hasbun Pacheco et al. |
| 10,067,840 | B1 | 9/2018 | Labaj et al. |
| 10,216,422 | B2 | 2/2019 | Kim et al. |
| 10,419,530 | B2 | 9/2019 | Shirazipour |
| 10,572,323 | B1 | 2/2020 | Zhai et al. |
| 10,613,962 | B1 | 4/2020 | Delange |
| 10,838,833 | B1 | 11/2020 | Jibaja et al. |
| 2004/0017629 | A1 | 1/2004 | Lamberts et al. |
| 2006/0149900 | A1 | 7/2006 | Terry et al. |
| 2006/0285409 | A1 | 12/2006 | Hummler |
| 2007/0022244 | A1 | 1/2007 | Kimmery |
| 2007/0179993 | A1* | 8/2007 | Arruza ............... G06F 11/1612 |
| 2009/0055357 | A1* | 2/2009 | Richardson ....... G06F 16/24565 |
| 2009/0216910 | A1 | 8/2009 | Duchesneau |
| 2010/0046118 | A1 | 2/2010 | Lee et al. |
| 2010/0122146 | A1 | 5/2010 | Nazarian et al. |
| 2010/0217752 | A1 | 8/2010 | Deenadhayalan et al. |
| 2013/0128666 | A1 | 5/2013 | Avila et al. |
| 2014/0108855 | A1 | 4/2014 | Gopakumar et al. |
| 2014/0189440 | A1 | 7/2014 | Ba |
| 2015/0074450 | A1 | 3/2015 | Blount et al. |
| 2015/0310349 | A1 | 6/2015 | Li |
| 2015/0199243 | A1 | 7/2015 | Wu et al. |
| 2016/0041870 | A1 | 2/2016 | Davis et al. |
| 2016/0042024 | A1 | 2/2016 | Campanotti et al. |
| 2016/0092140 | A1 | 3/2016 | Santaniello et al. |
| 2016/0188424 | A1 | 6/2016 | Walls |
| 2017/0039140 | A1 | 2/2017 | Zhu |
| 2017/0132525 | A1* | 5/2017 | Rozier ................. G06F 16/215 |
| 2017/0147436 | A1 | 5/2017 | Borlick et al. |
| 2017/0207981 | A1 | 7/2017 | Maguire et al. |
| 2018/0018582 | A1 | 1/2018 | Unsal et al. |
| 2018/0032398 | A1 | 2/2018 | Hasegawa |
| 2018/0081571 | A1 | 3/2018 | Akshara |
| 2018/0143762 | A1 | 5/2018 | Kim et al. |
| 2018/0174658 | A1 | 6/2018 | Kikuchi |
| 2018/0181087 | A1 | 6/2018 | Komatsu et al. |
| 2018/0267858 | A1 | 9/2018 | Bacha et al. |
| 2018/0330258 | A1 | 11/2018 | Harris et al. |
| 2018/0357535 | A1 | 12/2018 | Shulkin et al. |
| 2019/0050318 | A1 | 2/2019 | Beltman et al. |
| 2019/0095299 | A1* | 3/2019 | Liu ..................... G06F 11/2257 |
| 2019/0122096 | A1 | 4/2019 | Husain |
| 2019/0235484 | A1 | 8/2019 | Ristovski et al. |
| 2019/0278498 | A1 | 9/2019 | Dedrick |
| 2019/0306121 | A1* | 10/2019 | Anderson ........... H04L 61/6063 |
| 2020/0004434 | A1 | 1/2020 | Borlick et al. |
| 2020/0004435 | A1 | 1/2020 | Borlick et al. |
| 2020/0004439 | A1 | 1/2020 | Borlick et al. |
| 2020/0004623 | A1 | 1/2020 | Borlick et al. |
| 2020/0004625 | A1 | 1/2020 | Borlick et al. |
| 2020/0051347 | A1 | 2/2020 | Bohl et al. |
| 2020/0097921 | A1 | 3/2020 | Ghosh et al. |

OTHER PUBLICATIONS

Ryu, J. et al.; "Effects of Scrubbing on Reliability in Storage Systems"; Pohang University of Science and Technology; 2009.

"Special instructions to remove latent Parity Inconsistency (PI) errors and upgrade a disk drive to a new firmware version", Reference #: S1003638, dated Mar. 4, 2011, (online) retrieved from the Internet at URL> http://www-01.ibm.com/support/docview.wss?uid=ssg1S1003638 on May 17, 2018, Total 4 pages.

"How RAID-level disk scrubs verify data integrity", dated May 2013, (online) retrieved from the Internet at URL> https://library.netapp.com/ecmdocs/ECMP1196912/html/GUID-81F8BE on May 17, 2018.

Anonymously; "System and Method to do Data Scrubbing of RAID by Leveraging Array Workload Regularity"; dated Dec. 19, 2014., An IP.com Prior Art Database Technical Disclosure, (online) retrieved from the Internet at URL>http://ip.com/IPCOM/000239983D, Total 5 pages.

Anonymously, "System and Method of Array Scrub Adaptive Adjustment" dated Dec. 22, 2015, An IP.com Prior Art Database Technical Disclosure, (online) retrieved from the Internet at URL> http://ip.com/IPCOM/000244567D, Total 9 pages.

Barhate, D. et al., "Method for Logging Writes on Erasure Coded Storage System to Optimize the Network Usage Across Nodes for Data Updates"; dated Mar. 8, 2017, An IP.com Prior Art Database Technical Disclosure, (online), retrieved from the Internet at URL>http://ip.com/IPCOM/000249629D, Total 5 pages.

"storage aggregate scrub", NetApp ONTAP9 Documentation Center, (online) retrieved from the Internet at URL> https://docs.netapp.com/ontap-9/index.jsp?topic=%2Fcom.netapp.doc.dot-cm-cmpr-920%2Fstorage_aggregate_scrub.html on May 17, 2018.

"S.M.A.R.T.", Wikipedia, (online), retrieved Jun. 20, 2018 from the Internet at URL>https://en.wikipedia.org/wiki/S.M.A.R.T., Total 20 pages.

List of IBM Patents or Patent Applications Treated as Related, dated Jun. 29, 2018 pp. 2.

U.S. Appl. No. 16/023,443, filed Jun. 29, 2018.

U.S. Appl. No. 16/023,502, filed Jun. 29, 2018.

Preliminary Amendment dated Oct. 4, 2018, pp. 9, for U.S. Appl. No. 16/023,502.

U.S. Appl. No. 16/103,545, filed Aug. 14, 2018.

Preliminary Amendment dated Aug. 14, 2018, pp. 12, for U.S. Appl. No. 16/103,545.

List of IBM Patents or Patent Applications Treated as Related, dated Oct. 2, 2018, pp. 2.

U.S. Appl. No. 16/115,540, filed Aug. 28, 2018.

Preliminary Amendment dated Aug. 28, 2018, pp. 12, for U.S. Appl. No. 16/115,540.

U.S. Appl. No. 16/145,161, filed Sep. 27, 2018.

Preliminary Amendment dated Sep. 27, 2018, pp. 14, for U.S. Appl. No. 16/145,161.

PCT International Search Report and Written Opinion dated Oct. 12, 2019, pp. 9, for International Application No. PCT/IB2019/055213.

English machine translation of CN108108810A dated Jun. 1, 2018, pp. 32.

U.S. Appl. No. 10/216,422 is the English language counterpart of CN108108810A.

Office Action dated Oct. 30, 2019, pp. 35, for U.S. Appl. No. 16/023,502.

Office Action dated Sep. 18, 2019, pp. 13, for U.S. Appl. No. 16/115,540.

Response dated Dec. 18, 2019, pp. 11, to Office Action dated Sep. 18, 2019, pp. 13, for U.S. Appl. No. 16/115,540.

Office Action dated Mar. 25, 2020, pp. 28, for U.S. Appl. No. 16/115,540.

Office Action dated Mar. 4, 2020, pp. 39, for U.S. Appl. No. 16/023,443.

Response dated Jan. 30, 2020, pp. 14, to Office Action dated Oct. 30, 2019, pp. 35, for U.S. Appl. No. 16/023,502.

Final Office Action dated Feb. 27, 2020, pp. 34, for U.S. Appl. No. 16/023,502.

Office Action dated Apr. 16, 2020, pp. 45, for U.S. Appl. No. 16/103,545.

Amendment filed Apr. 27, 2020, pp. 14, to Final Office Action dated Feb. 27, 2020, pp. 34, for U.S. Appl. No. 16/023,502.

Office Action dated May 12, 2020, pp. 32, for U.S. Appl. No. 16/023,502.

Response dated Jun. 1, 2020, pp. 14, for Office Action dated Mar. 4, 2020, pp. 39, for U.S. Appl. No. 16/023,443.

Final Office Action dated Jun. 18, 2020 pp. 27, for U.S. Appl. No. 16/023,443.

Response dated Jun. 20, 2020, pp. 10, to Office Action dated Mar. 25, 2020, pp. 28, for U.S. Appl. No. 16/115,540.

Office Action dated Jun. 25, 2020, pp. 78, for U.S. Appl. No. 16/145,161.

(56) References Cited

OTHER PUBLICATIONS

Response dated Aug. 18, 2020, pp. 15, for Final Office Action dated Jun. 18, 2020, pp. 27, for U.S. Appl. No. 16/023,443.
Notice of Allowance dated Aug. 28, 2020, pp. 10, for U.S. Appl. No. 16/023,443.
Notice of Allowance dated Nov. 30, 2020, pp. 20, for U.S. Appl. No. 16/115,540.
Final Office Action dated Dec. 16, 2020, pp. 63, for U.S. Appl. No. 16/145,161.
Notice of allowance3 dated Jan. 12, 2021, pp. 9, for U.S. Appl. No. 16/023,443.
Response dated Dec. 17, 2020, pp. 16, to Final Office Action dated Oct. 29, 2020, pp. 50, for U.S. Appl. No. 16/103,545.
Response dated Dec. 3, 2020, pp. 9, to Final Office Action dated Oct. 21, 2020, pp. 60, for U.S. Appl. No. 16/023,502.
Notice of Allowance dated Jan. 12, 2021, pp. 20, for U.S. Appl. No. 16/023,502.
Notice of Allowance dated Jan. 19, 2021, pp. 10, for U.S. Appl. No. 16/103,545.
Response dated Jul. 14, 2020, 15, to Office Action dated Apr. 16, 2020, pp. 45, for U.S. Appl. No. 16/103,545.
Response dated Aug. 13, 2020, pp. 15, to Office Action dated May 12, 2020, pp. 32, for U.S. Appl. No. 16/023,502.
Interview Summary dated Aug. 13, 2020, pp. 7, for U.S. Appl. No. 16/023,443.
Final Office Action dated Oct. 21, 2020, pp. 60, for U.S. Appl. No. 16/023,502.
Final Office Action dated Oct. 29, 2020, pp. 50, for U.S. Appl. No. 16/103,545.
GB Examination Report dated Feb. 15, 2021, pp. 5, for Application No. GB2100441.1.
Response dated Feb. 16, 2021, pp. 17, to Final Office Action dated Dec. 16, 2021, pp. 63, for U.S. Appl. No. 16/145,161.
Notice of Allowance dated Mar. 26, 2021, pp. 19, for U.S. Appl. No. 16/145,161.
List of IBM Patents and Applications Treated as Related, dated Apr. 15, 2021, pp. 2.
U.S. Appl. No. 17/152,782, filed Jan. 19, 2021.
Preliminary Amendment dated Jan. 19, 2021, pp. 12, for U.S. Appl. No. 17/152,782.
Preliminary Amendment dated Feb. 3, 2021, pp. 9, for U.S. Appl. No. 17/152,782.
Response dated Sep. 25, 2020, pp. 18, to Office Action dated Jun. 25, 2020, pp. 78, for U.S. Appl. No. 16/145,161.
Notice of Allowance dated Oct. 1, 2020, pp. 41, for U.S. Appl. No. 16/115,540.
Office Action dated Jan. 29, 2021, pp. 18, for U.S. Appl. No. 16/115,540.

* cited by examiner

Data Set Replication Information

Storage Device Information

Data Integrity Information

DETERMINING WHEN TO PERFORM A DATA INTEGRITY CHECK OF COPIES OF A DATA SET USING A MACHINE LEARNING MODULE

BACKGROUND OF THE INVENTION

1. Field of the Invention

The present invention relates to a computer program product, system, and method for using a machine learning module to determine when to perform a data integrity check of copies of a data set.

2. Description of the Related Art

A system may maintain multiple backup copies of important information, such as a system configuration data set providing system settings and data structures used to configure and operate the system. Periodically the system may perform an error checking operation to determine whether the copies of the data set, which may be stored on different Redundant Array of Independent Disks (RAID) ranks, have data errors and, if so, correct the errors using parity and error correction information. Each of the RAID ranks may maintain parity information used to validate and correct errors in the data. In RAID arrays, a parity scrub operation may be periodically performed on the different copies of the data by reading all the blocks in a RAID rank stored across storage devices in a RAID array, and comparing the read data to the parity information to determine if there are inconsistencies. If there are errors, the parity information may be used to correct data errors. Parity scrub operations are computationally expensive, requiring system computational resources and continual access to read data and parity data from the storage array. As the size of a system configuration data set has increased, the extent of the parity checking operations for a parity scrub of multiple copies of the system configuration data set requires more time to complete, which may result in latency delays for other operations and applications seeking to access the data in the RAID array.

There is a need in the art for improved techniques for performing a data integrity check.

SUMMARY

An embodiment comprises a computer program product, system, and method for using a machine learning module to determine when to perform a data integrity check of copies of a data set. Input on storage attributes of a plurality of storage units, each storage unit of the storage units storing a copy of a data set, is provided to a machine learning module to produce an output value. A determination is made as to whether the output value indicates to perform a data integrity check of the copies of the data set. A determination is made as to whether the copies of the data set on different storage units are inconsistent in response to determining to perform the data integrity check. At least one of the copies of the data set is corrected to synchronize all the copies of the data set.

The above embodiment provides improved computer technology for determining when to perform data integrity checking of copies of a data set, such as a system configuration data set having system critical information, that use a machine learning module and algorithm to dynamically determine the likelihood that the copies of a data set are in an inconsistent state. The machine learning module may receive as input current operating parameters recorded for storage devices in which the copies of the data set are stored and state transition information for the system using the system configuration information stored in the copies of the data set and produce output indicating the likelihood that copies of the data set are in an inconsistent state. In this way, the determination of when to perform the data integrity check is optimized based on current operating conditions and any state transitions to perform the data integrity check at an optimized frequency, as opposed to a predefined interval or automatically that does not consider current operating conditions or state transitions.

In a further embodiment, the correcting the at least one of the copies of the data set to synchronize all the copies of the data set comprises performing one of: using parity information for each copy of the data set of the copies of the data set to perform a parity check of the copy of the data set and if the copy of the data set has errors, using the parity information to perform error correction of the copy of the data set; and for each copy of the data set comprising a replication copy of the data set of a primary copy of the data set, copying the primary copy of the data set to the replication copy of the data set if the replication copy of the data set does not match the primary copy of the data set.

In a further embodiment, each storage unit comprises a different rank in a Redundant Array of Independent Disks (RAID), wherein each rank of ranks includes a copy of the data set.

In a further embodiment, there are at least three storage units, wherein the data set comprises system configuration information. A primary copy of the copies of the data set in one storage unit is currently being used to provide system configuration parameters to a system. A write to the primary copy of the data set is processed and the write is replicated to at least one additional copy of the data set in at least one additional storage unit.

With the above embodiment, the machine learning module is used to determine when to perform a data integrity check when there are at least three copies of system configuration information to optimize the determination of when to perform a data integrity check of the copies of the system configuration information to determine whether they are consistent.

In a further embodiment, the input on attributes of the storage unit are provided to the machine learning module to determine whether to perform the data integrity check in response to at least one of: replicating the write to the at least one additional copy of the data set; and detecting a state transition at the system using the system configuration information in the data set.

With the above embodiment, the machine learning module is invoked for those situations that may increase the likelihood the data set copies are inconsistent, such as when a write is replicated, because errors may occur during the write and for a state transition that could result in data errors in the copies of the data set. In this way, the invocation of the machine learning module is optimized to run to determine whether to perform a data integrity check for those situations where data integrity is most likely to be compromised to optimize the allocation of resources for data integrity checking.

In a further embodiment, a replication count indicating a number of times a write has been replicated to at least one additional copy of the data set is incremented in response to replicating the data set to at least one additional storage unit. A determination is made as to whether the replication count satisfies a condition with respect to a data integrity check frequency. The input of the storage attributes of the storage units are provided to the machine learning module in response to the replication count satisfying the condition with respect to the data integrity check frequency. The replication count is reset in response to the replication count satisfying the condition with respect to the data integrity check frequency.

With the above embodiment, the machine learning module is invoked for those situations that may increase the likelihood the data set copies are inconsistent, such as when a threshold number of replications have occurred, because a large number of replications increases the likelihood of data errors in the copies of the data set. In this way, the invocation of the machine learning module is optimized to run to determine whether to perform a data integrity check for those situations where a number of replication operations reaches a point that there is a possibility data integrity is compromised to optimize the allocation of resources for data integrity checking.

In a further embodiment, the output value from the machine learning module comprises a number from zero to one indicating a likelihood that the copies of the data set are not consistent. The determining whether the output value indicates to perform the data integrity check comprises not performing the data integrity check in response to the output value being less than a lower bound, performing the data integrity check in response to the output value being greater than an upper bound, and adjusting the data integrity check frequency based on the output value in response to the output value being between the lower bound and the upper bound.

With the above embodiment, the invocation of the machine learning module is optimized by only invoking when the output value strongly indicates that there is a likelihood of data integrity issues. Further, the data integrity check frequency may be adjusted based on the output value to optimize the threshold used to determine when to perform a data integrity check based on a replication count.

In a further embodiment, the storage attributes of the storage unit used as the input to the machine learning module include at least two of: state transition information at a system using the data set having information on a state transition resulting from an error event in at least one of the system and the storage units storing the copies of the data set; a type of at least one storage device comprising the storage unit; an age of the at least one storage device from first use; a firmware level of the at least one storage device; a read operations per second at the at least one storage device; and a write operations per second at the at least one storage device.

With the above embodiment, the machine learning module is provided with input information most helpful in determining whether there is a data consistency issue with the data set copies to optimize the determination of when to perform the data integrity check.

In a further embodiment, the state transition information indicates at least one of a failure at a system using the data set, a failover or failback involving the system using the data set, an error in one of the storage units storing the copies of the data set, a power cycle or reset event at the system.

An additional embodiment comprises a computer program product, system, and method for a data integrity check of copies of a data set in storage units. A determination is made of whether to train a machine learning module. In response to determining to train the machine learning module, a determination is made of input comprising storage attributes of the storage units storing the copies of the data set. The input is used to train the machine learning module to produce a desired output value indicating to perform the data integrity check of the copies of the data set in the storage units. The machine learning module is executed to produce an output value used to determine whether to perform the data integrity check.

With the above embodiment, the machine learning module may continually be retrained to improve the predictive accuracy of determining whether the copies of the data set are inconsistent using a current state of operational parameters and feedback on actual experienced data inconsistencies or lack of data set inconsistencies. In this way, the allocation of computational and storage resources is optimized to data integrity checking operations by dynamically determining a frequency at which to perform data integrity checking of copies of a data set that are based on a prediction as to whether data inconsistency is likely given current operating conditions at a storage device.

In a further embodiment, the data integrity check determines that the copies of the data set are inconsistent. The determination to train the machine learning module is made in response to the determining that the copies of the data set are inconsistent.

The above embodiment optimizes the decision to train the machine learning module by determining to train the module when an actual data inconsistency occurs so as to train the machine learning module to recognize data inconsistency for operational parameters and state transitions that are present when a data inconsistency is detected.

In a further embodiment, a determination is made that the copies of the data set have been determined to be consistent a consistency threshold number of times during data integrity check operations. The desired output value used to train the machine learning module is set to an output value indicating to not perform the data integrity check in response to determining that the copies of the data set have been determined to be consistent for the consistency threshold number of times. The determination to train the machine learning module is made in response to the determining that the copies of the data set have been determined to be consistent for the consistency threshold number of times.

With the above embodiment, a decision to train the machine learning module is optimized to indicate to not perform a data integrity check, such as indicating there is a low likelihood of a data inconsistency error, when the copies of the data set have been determined to be consistent a threshold number of times. In such a situation, the machine learning module is optimized by being trained to recognize a state of no need for a data integrity check because the data has been consistent for a threshold length of time.

In a further embodiment, a state transition at a system using the data is detected. The desired output value used to train the machine learning module is set to an output value indicating to perform the data integrity check in response to detecting the state transition, The determination to train the machine learning module is made in response to the detecting the state transition.

With the above embodiment, the decision to train the machine learning module is optimized to indicate to perform a data integrity check, such as indicating there is a high likelihood of a data inconsistency error, when a state transition in the system using the data set is detected because data integrity issues are more likely to arise as a result of a state transition.

In a further embodiment, to train the machine learning module comprises: executing the machine learning module with the input to produce a current output value; determining a margin of error of the current output value of the machine learning module and the desired output value; and using the margin of error and the input to train weights and biases of nodes in the machine learning module to produce the desired output value.

In a further embodiment, the machine learning module produces output values from inputs from storage arrays of storage devices managed by storage controllers. Each storage controller of the storage controllers maintains copies of a data set comprising system configuration information for the storage controller. The machine learning module provides the storage controllers with output values based on the input indicating whether the storage controllers should perform the data integrity check of the copies of the data set used by the storage controllers.

With the above embodiment, the machine learning module is optimized based on input from different storage controllers, each having their own copies of a data set, to be trained more frequently and hence more accurate because it is trained from operational parameters in multiple storage controllers. The machine learning module provides a network service in providing output values that indicate whether a particular storage controller needs to perform a data integrity check.

DETAILED DESCRIPTION

Prior art systems that periodically perform parity checking operations of copies of a data set, such as the copies stored in different RAID ranks of a RAID array, direct resources and storage accesses away from applications for the purpose of performing error checking and handling. This redirection of computational and storage resources may result in latency delays to applications trying to access data in the storage array. Prior art systems that periodically perform the data integrity check at fixed intervals may perform error checking more frequently than needed if there are relatively few errors in the storage array, thus needlessly causing latency delays. Further, periodically performing error checking operations at fixed intervals may perform the data integrity check and error checking less frequently than needed if there are a greater number of errors occurring in the storage array, which may result in data integrity errors in the system.

Moreover, errors in copies of a system configuration data set providing backup copies of the system configuration information will render those copies unsuitable as backup copies in case the primary copy of the system configuration information becomes corrupted or unavailable. In such case, the system configuration information cannot be readily recovered from the copies of the system configuration data set.

Described embodiments provide improved computer technology for determining when to perform data integrity checking of copies of a data set, such as a system configuration data set having system critical information, that use a machine learning module and algorithm to dynamically determine the likelihood that the copies of a data set are in an inconsistent state. The machine learning module may receive as input current operating parameters recorded for storage devices in which the copies of the data set are stored and state transition information for the system using the system configuration information stored in the copies of the data set and produce output indicating the likelihood that copies of the data set are in an inconsistent state.

The machine learning module may continually be retrained to improve the predictive accuracy of determining whether the copies of the data set are inconsistent using a current state of operational parameters and feedback on actual experienced data inconsistencies or lack of data set inconsistencies. In this way, the described embodiments optimize the allocation of computational and storage resources to data integrity checking operations by dynamically determining a frequency at which to perform data integrity checking of copies of a data set that are based on a prediction as to whether data inconsistency is likely given current operating conditions at a storage device.

Figure 1:
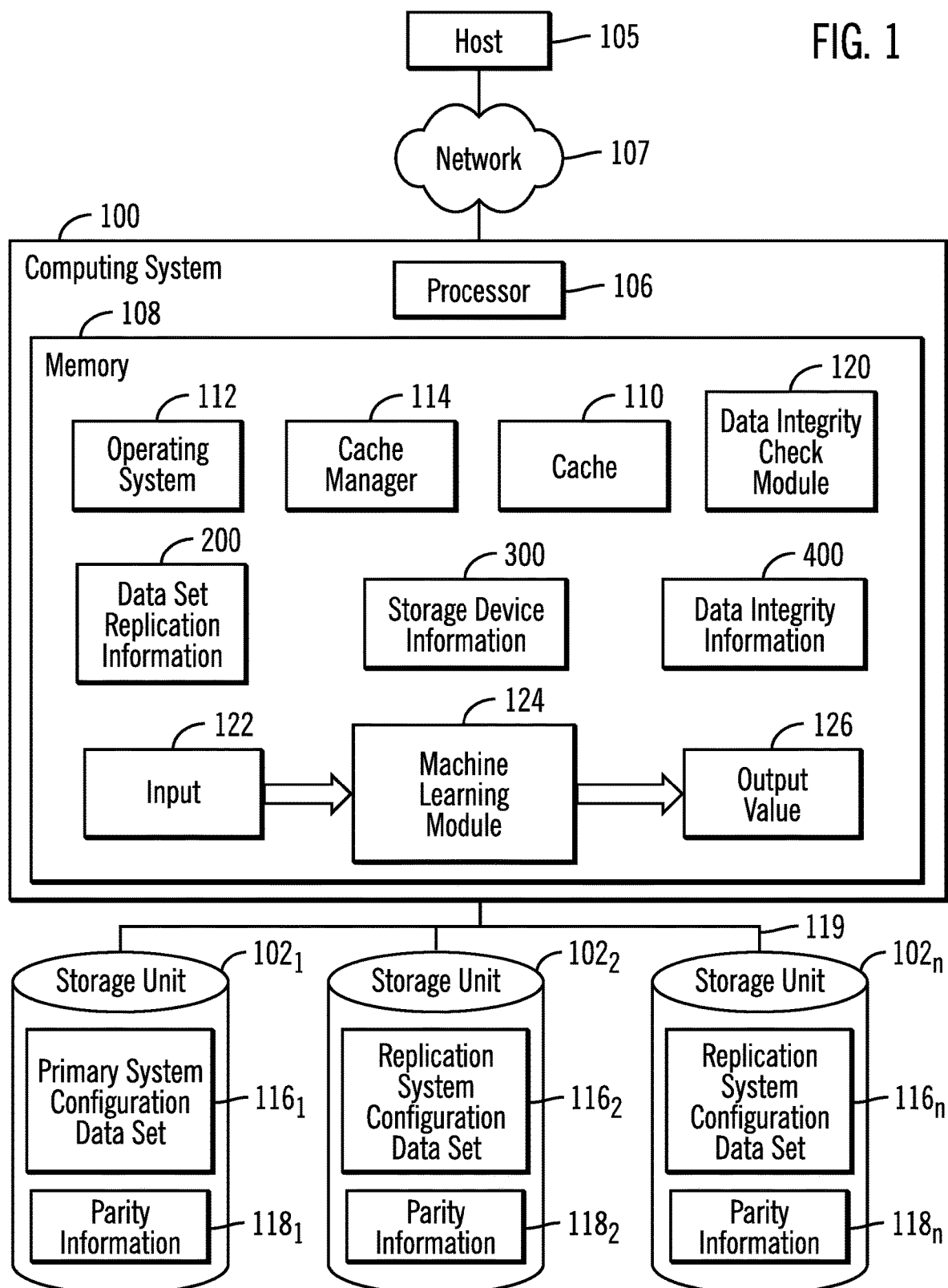
FIG. 1 illustrates an embodiment of a computing environment.

FIG. 1 illustrates an embodiment of a computing environment. A computing system 100 accesses data in storage units $102_1, 102_2 \ldots 102_n$, which each may comprise one or more storage devices, and may be configured as a storage array, e.g., a RAID array of storage devices. In certain embodiments, each storage unit $102_i$ may comprise a RAID rank. The computing system 100 includes a processor 106 and a memory 108, including a cache 110 to cache data for the storage units $102_1, 102_2 \ldots 102_n$. The processor 106 may comprise one or more central processing units (CPUs) or a group of multiple cores on a single CPU. The cache 110 buffers data requested by processes within the computing system. Alternatively, the computing system 100 may comprise a storage controller that processes Input/Output (I/O) access requests for tracks in the storage units $102_1, 102_2 \ldots 102_n$ from hosts 105 connecting to the computing system 100 (storage controller) over a network 107.

The memory 108 further includes an operating system 112 to manage requests from internal processes in the computing system 100 and/or from hosts 105 for tracks in the storage units $102_1, 102_2 \ldots 102_n$. A cache manager 114 maintains accessed tracks in the cache 110 for future read access to the tracks to allow the accessed tracks to be returned from the faster access cache 110 instead of having to retrieve from the storage array 104. A track may comprise any unit of data configured in the storage array 104, such as a track, Logical Block Address (LBA), etc., which is part of a larger grouping of tracks, such as a volume, logical device, etc.

The storage unit $102_k$ maintains a primary system configuration data set $116_1$ that provides system configuration information for the computing system 100 to use for operations, such as file allocation tables, registry database, and other system settings and parameters used to control the computing system 100 operations. The primary system configuration data set $116_1$ is replicated to one or more replication system configuration data sets $116_2 \ldots 116_n$ in additional storage units $102_2 \ldots 102_n$, to provide backup copies of the system configuration data set $102_1$ to be available for recovery of the system configuration data set in the event the primary set $102_1$ is corrupt or unavailable. The storage units $102_1, 102_2 \ldots 102_n$ also maintain parity information $118_1, 118_2 \ldots 118_n$, such as error correction codes (ECC), checksums, etc., that may be used to validate and error correct the configuration data sets $116_1, 116_2 \ldots 116_n$. In one embodiment, each storage unit $102_1, 102_2 \ldots 102_n$ may comprise a RAID rank, and the parity information comprises the parity data for the RAID rank storing the system configuration data set $116_1, 116_2 \ldots 116_n$. The storage units $102_1, 102_2 \ldots 102_n$ may comprise RAID ranks in a same RAID system or in separate RAID storage systems. The computing system 100 may connect to the storage units $102_1, 102_2 \ldots 102_n$ over a connection 119, such as a network connection, direct cable connection, etc. Alternatively, the storage units $102_1, 102_2 \ldots 102_n$ may comprise singular storage devices or other arrays of storage devices.

Although the copies of the data set $116_1, 116_2 \ldots 116_n$ are described in certain embodiments as comprising system configuration settings, in additional embodiments the data sets $116_1, 116_2 \ldots 116_n$ may comprise other types of information, such as customer data, databases, etc.

The memory 108 further includes a data integrity check module 120 to use the parity information $118_i$ for each configuration data set $116_i$ to validate the system configuration data set $116_i$ and perform error correction if the data is not valid; data set replication information 200 maintaining information on the replication of the primary configuration data set $116_1$ to additional copies; storage device information 300 having operational information on storage devices implementing the storage units $102_1, 102_2 \ldots 102_n$; and data integrity information 400 used to determine whether to perform a data integrity check for the copies of the data set $116_1, 116_2 \ldots 116_n$. The data integrity check module 120 may provide the storage device information 300 and state transition information for the computing system 100 as input 122 to a machine learning module 124 to produce an output value 126 that indicates a likelihood that the copies of the data set $116_1, 116_2 \ldots 116_n$ are inconsistent. State transition information for the computing system 100 may comprise an event indicating a change in the operational state, such as an error event, failover from the computing system 100 to another system, failback from another system to the computing system 100, power cycle event, warmstart, coldstart, initial code load, etc., or any other event that has a high likelihood of causing inconsistencies in the copies of the data set $116_1, 116_2 \ldots 116_n$.

The machine learning module 124 may implement a machine learning technique such as decision tree learning, association rule learning, neural network, inductive programming logic, support vector machines, Bayesian models, etc., to receive as input 122 certain of the storage device information 300 and state transition information to generate an output value 126 or confidence level, such as a value between 0 and 1, indicating a likelihood that the copies of the data set $116_1, 116_2 \ldots 116_n$ are inconsistent, i.e., do not match, meaning one copy has become out-of-synch due to errors, such as dropped writes, or changes not being successfully replicated to the replication copies data set $116_2 \ldots 116_n$.

In one embodiment, the machine learning module 124 may comprise an artificial neural network programs trained using back propagation to adjust weights and biases at nodes in a hidden layer of the first artificial neural network program to produce an output value 126 based on input 122 comprising storage device information 200. Back propagation may comprise an algorithm for supervised learning of artificial neural networks using gradient descent. Given an artificial neural network and an error function, the method may calculate the gradient of the error function with respect to the neural network's weights and biases.

The operating system 112, cache manager 114, the data integrity check module 120, and the machine learning module 124 are shown in FIG. 1 as program code loaded into the memory 108 and executed by the processor 106. Alternatively, some or all of the functions may be implemented in hardware devices in the system 100, such as in Application Specific Integrated Circuits (ASICs) or executed by separate dedicated processors.

The storage units $102_1, 102_2 \ldots 102_n$ may each comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices implementing the storage units $102_1, 102_2 \ldots 102_n$ may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor. Further, the storage units $102_1, 102_2 \ldots 102_n$ may each comprise a RAID rank configured in a RAID array.

The memory 108 may comprise a suitable volatile or non-volatile memory devices, including those described above.

The network 107 may comprise a Storage Area Network (SAN), a Local Area Network (LAN), a Wide Area Network (WAN), the Internet, and Intranet, etc.

In RAID embodiments, the error checking operation may comprise a parity scrub, where the data integrity check module 120 reads blocks within a RAID stripe of a RAID array configured within storage devices 102 and identifies errors using the parity data in parity blocks, such as dropped writes, media errors, check sum errors, parity consistency, etc.

In FIG. 1, the machine learning module 124 is shown separate from the data integrity check module 120. In further embodiments, some or all components of the machine learning module 124 may be part of the data integrity check module 120.

Figure 2:
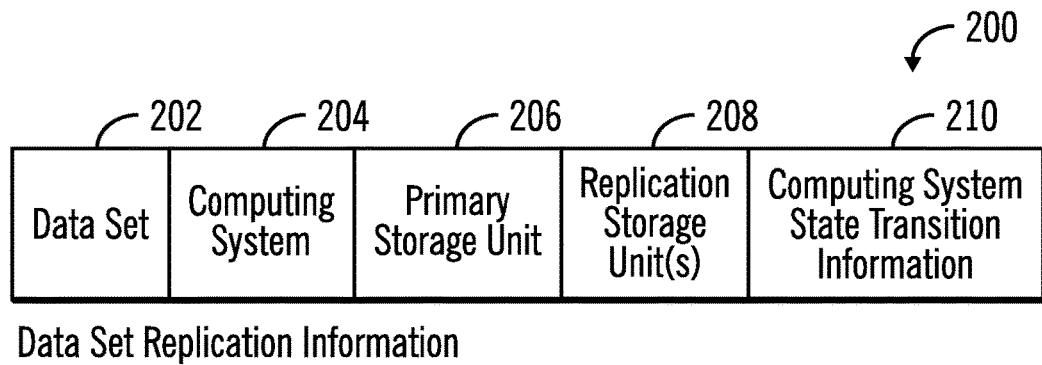
FIG. 2 illustrates an embodiment of data set replication information.

FIG. 2 illustrates an embodiment of data set replication information 200, and includes an identifier of a data set 200 to be replicated at copies $116_2 \ldots 116_n$; a computing system 204 that uses the data set 202, such as system configuration settings; a primary storage unit 206, such as storage unit $102_1$ storing the primary copy of the data set $116_1$, e.g., system configuration or other information for the computing system 204; replication storage units 200, such as one or more storage units $102_2 \ldots 102_n$ storing replication or backup copies $116_2 \ldots 116_n$ of the data set 202; and computing system state transition information 210, such as information on a recent state transition at the computing system 204 that is likely to result in the copies of the data set $116_1$, $116_2 \ldots 116_n$ becoming inconsistent, e.g., failover, failback, warmstart, code load, etc.

Figure 3:
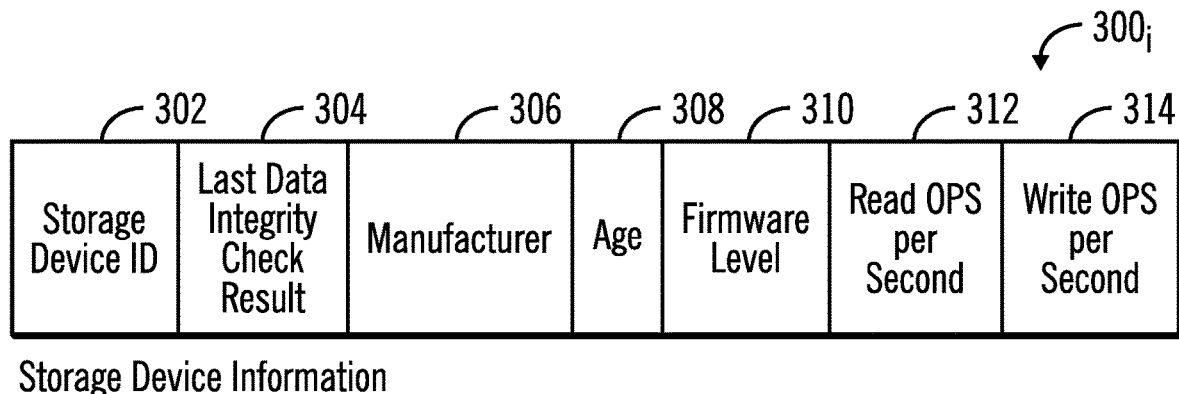
FIG. 3 illustrates an embodiment of storage device information.

FIG. 3 illustrates an embodiment of an instance of storage device information $300_i$ for a storage device in which the storage units $102_1$, $102_2 \ldots 102_n$ are implemented, and includes a storage device identifier (ID) 302 of a storage device; a last data integrity check result 304, such as the result of the last time the data integrity check module 120 performed data integrity check, which may indicate a copy of the data set $116_i$ stored in the storage device 302 was found consistent or inconsistent; a manufacturer 306 of the storage device 302; an age 308, which may be measured as a time since first used or measured by a number of writes that have occurred, e.g., wear; a firmware level 310 of the storage device 302; read operations ("OPS") per second 312 rate measured for a last number of reads (N) tracked at the storage device 302; and write operations per second 314 rate measured for the last number of writes (N) tracked at the storage device 302. The storage device information $300_i$ includes static information, such as 302, 306, 310, and dynamic information that may be continually updated, such as in blocks 304, 308, 312, and 314. For instance the last error check result 304 may be updated each time a data integrity check is performed at the storage device 302 and the read 312 and write 314 operations per second and age 308 may be updated after one or more read/write operations.

In certain embodiments, each of the storage units $102_2 \ldots 102_n$ are implemented in multiple storage devices, where there is storage device information $300_i$ for each storage device.

Figure 4:
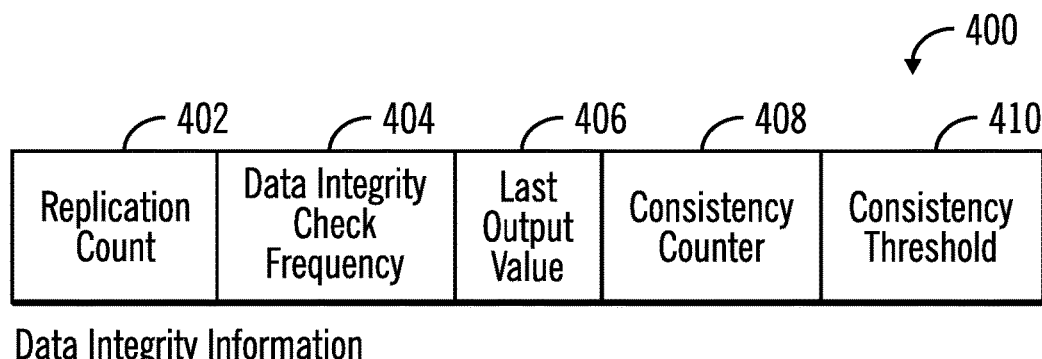
FIG. 4 illustrates an embodiment of data integrity check information.

FIG. 4 illustrates an instance of data integrity information 400 maintained for a data set, that includes: a replication count 402 indicating a number of time changes to the primary system configuration data $116_1$ have been replicated to the replication copies $116_2 \ldots 116_n$; a data integrity check frequency 404 indicating a replication count 402 value, i.e., threshold, that would trigger a data integrity check of the copies of the data set $116_1$, $116_2 \ldots 116_n$, i.e., a frequency at which data integrity check is performed for replications of the data set; a last output value 406 calculated by the machine learning module 124 for the data set; a consistency counter 408 indicating a consecutive number of data integrity check operations of the copies of the data set $116_1$, $116_2 \ldots 116_n$ that resulted in findings of consistency of the copies $116_1$, $116_2 \ldots 116_n$; and a consistency threshold 410 indicating a threshold number for the consistency counter 408 at which machine learning module 124 will be retrained.

Figure 5:
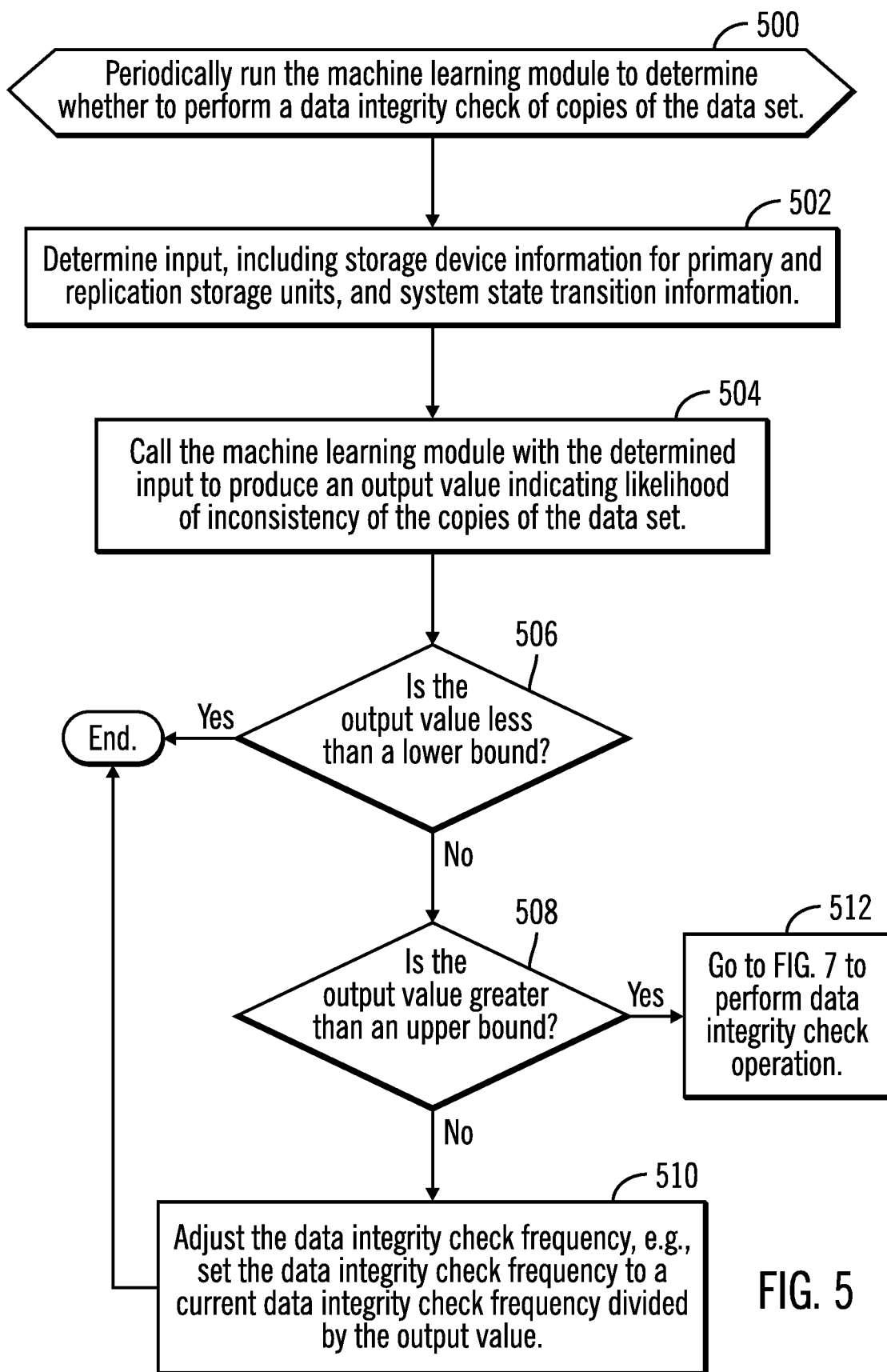
FIG. 5 illustrates an embodiment of operations to periodically run a machine learning module for data integrity check operations.

FIG. 5 illustrates an embodiment of operations performed by the data integrity check module 120 and/or machine learning module 124 to periodically run the machine learning module 124 to determine whether to perform a data integrity check of copies of the data set $116_1$, $116_2 \ldots 116_n$. The machine learning module 124 may be periodically run at time intervals or in response to events. Upon invoking (at block 500) the machine learning module 124, input 122 is determined (at block 502) from the storage device information $300_i$, for storage devices implementing the storage units $102_1$, $102_2 \ldots 102_n$, and system state transition information 210.

The machine learning module 124 is called (at block 504) with the determined input 122 to produce an output value 126 indicating a likelihood of inconsistencies of the copies of the data set $116_1$, $116_2 \ldots 116_n$. In one embodiment, the output value 126 may be between 0 and 1, with a value closer to 0 indicating a lower likelihood of the copies of the data set $116_1$, $116_2 \ldots 116_n$ being inconsistent and a value closer to 1 indicating a higher likelihood of data set inconsistency. In an alternative embodiment, the output value 126 may comprise one of two values, a first value indicating to perform the data integrity check and a second value indicating to not perform a data integrity check.

If (at block 506) the output value is less than a lower bound, which may indicate a low likelihood of inconsistency of the copies of the data set $116_1$, $116_2 \ldots 116_n$, then control ends. If (from the no branch of block 506) the output value is higher than the lower bound but less than (from the no branch of block 508) an upper bound, then the data integrity check frequency 404 may be adjusted (at block 510) based on the output value 126. In one embodiment, the data integrity check frequency 404 may be adjusted by setting the data integrity check frequency 404 to a current data integrity check frequency 404 divided by the output value 126. In alternative embodiments, other calculations and variables may be considered with the output value 126 to adjust the data integrity check frequency 404. If (at block 508) the output value 126 is greater than an upper bound, indicating a greater likelihood of the copies of the data set $116_2 \ldots 116_n$ being inconsistent, then control proceeds (at block 512) to FIG. 7 to perform the data integrity check operation on the copies of the data set $116_1$, $116_2 \ldots 116_n$.

With the embodiment of FIG. 5, the machine learning module 124 is run to determine a likelihood that there is an inconsistency in the copies of the data set $116_1 \ldots 116_n$ based on actual operating conditions of the one or more storage devices implementing the storage units $102_1 \ldots 102_n$ and system state transition information 210 on recent state transitions. This likelihood of inconsistency of the copies of the data set $116_1 \ldots 116_n$ is based on a trained machine learning algorithm that bases the determination of the likelihood of data set inconsistency on current operating conditions at the storage devices implementing the storage units $102_1$, $102_2 \ldots 102_n$, system state information 210 and statistical and probabilistic models that relate such operating conditions to a likelihood of data set inconsistency. In this way, a determination of an data integrity check frequency 404 is adjusted based on the likelihood of data set inconsistency so that the data integrity check frequency 404 is increased if there is a greater likelihood of data set inconsistency and the data integrity check frequency 404 is reduced if there is less of a likelihood of an error at the storage unit. Because the data integrity check frequency operations, involving comparisons of the copies of the data set $116_1 \ldots 116_n$, consume substantial processing resources, which may cause latency in other operations, adjusting the data integrity check frequency 404 based on actual operating conditions having a higher likelihood of data inconsistencies improves the allocation of system resources. If there is a low likelihood of data set inconsistencies, then the data integrity check frequency 404 may be reduced to reduce the number of data integrity check operations, thus freeing resources to reduce latency for other operations. However, if there is a higher likelihood of data set inconsistencies, then the data integrity check frequency 404 may be increased because the importance of the benefits of correcting inconsistencies in the copies of the data set $116_1 \ldots 116_n$, which is necessary to insure valid backups of the system configuration settings, offsets the negative impact of increased latency for other operations. In this way, the use of the machine learning module 124 to adjust the data integrity check frequency 404 optimizes the allocation of resources between data integrity checks and other operations.

Figure 6:
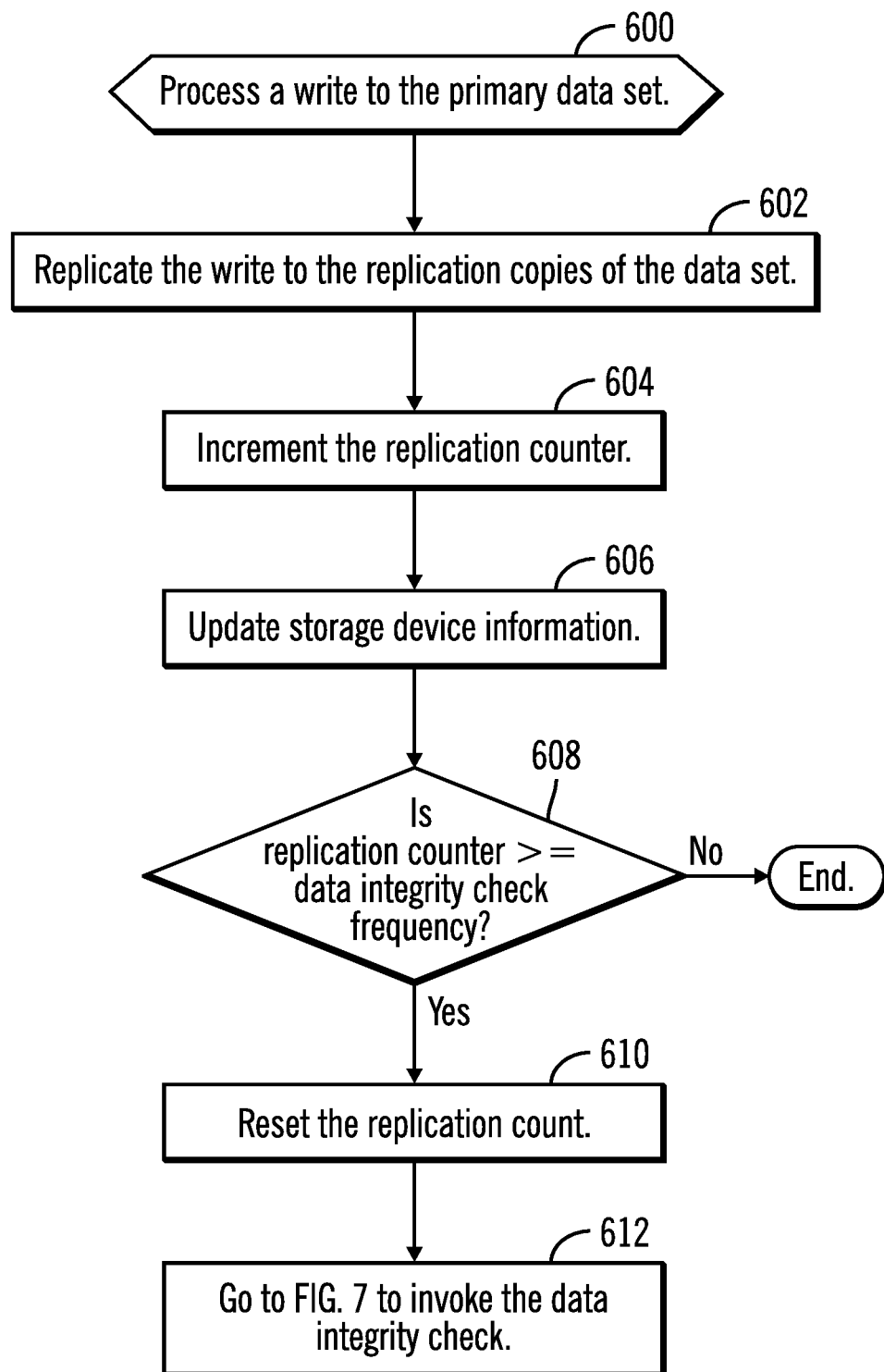
FIG. 6 illustrates an embodiment of operations to process a write request to a primary copy of the data set.

FIG. 6 illustrates an embodiment of operations performed by the operating system 112 to process an update to the system configuration settings in the primary system configuration data set $116_1$, such as an update to the system configuration settings. Upon processing (at block 600) a write to the primary system configuration data set $116_1$, the operating system 112 replicates (at block 602) the write to the replication copies of the data set $116_2$ . . . $116_n$, such as written to a storage device or striped across a rank of storage devices comprising the replication storage units $102_2$ . . . $102_n$. The replication count 402 is incremented (at block 604) and the storage device information $200_i$ for the storage devices forming the storage units $102_1$, $102_2$ . . . $102_n$ is updated (at block 606), such as in fields 308, 312, 314. If (at block 608) the replication count 402 is greater than or equal to the data integrity check frequency 404, then the replication count 402 is reset (at block 610) and control proceeds (at block 612) to FIG. 7 to perform a data integrity check of the copies of the data set $116_1$ . . . $116_n$. If (at block 608) the replication count 402 is less than the data integrity check frequency 404, then control ends.

In FIG. 6, the determination of whether to perform a data integrity check of the copies of the data set $116_1$ . . . $116_n$ is based on whether the replication count 402 is greater than or less than the data integrity check frequency 402. In alternative embodiments, other conditions or relationships between the replication count 402 and the data integrity check frequency 404 may be used to determine whether to data integrity check or not.

With the embodiment of FIG. 6, data integrity check operations are optimized by checking for data set inconsistencies when the replication count 402 exceeds the data integrity check frequency 404, which is adjusted based on a determination of a likelihood of data set inconsistencies with respect to the copies of the data set $116_1$ . . . $116_n$.

Figure 7:
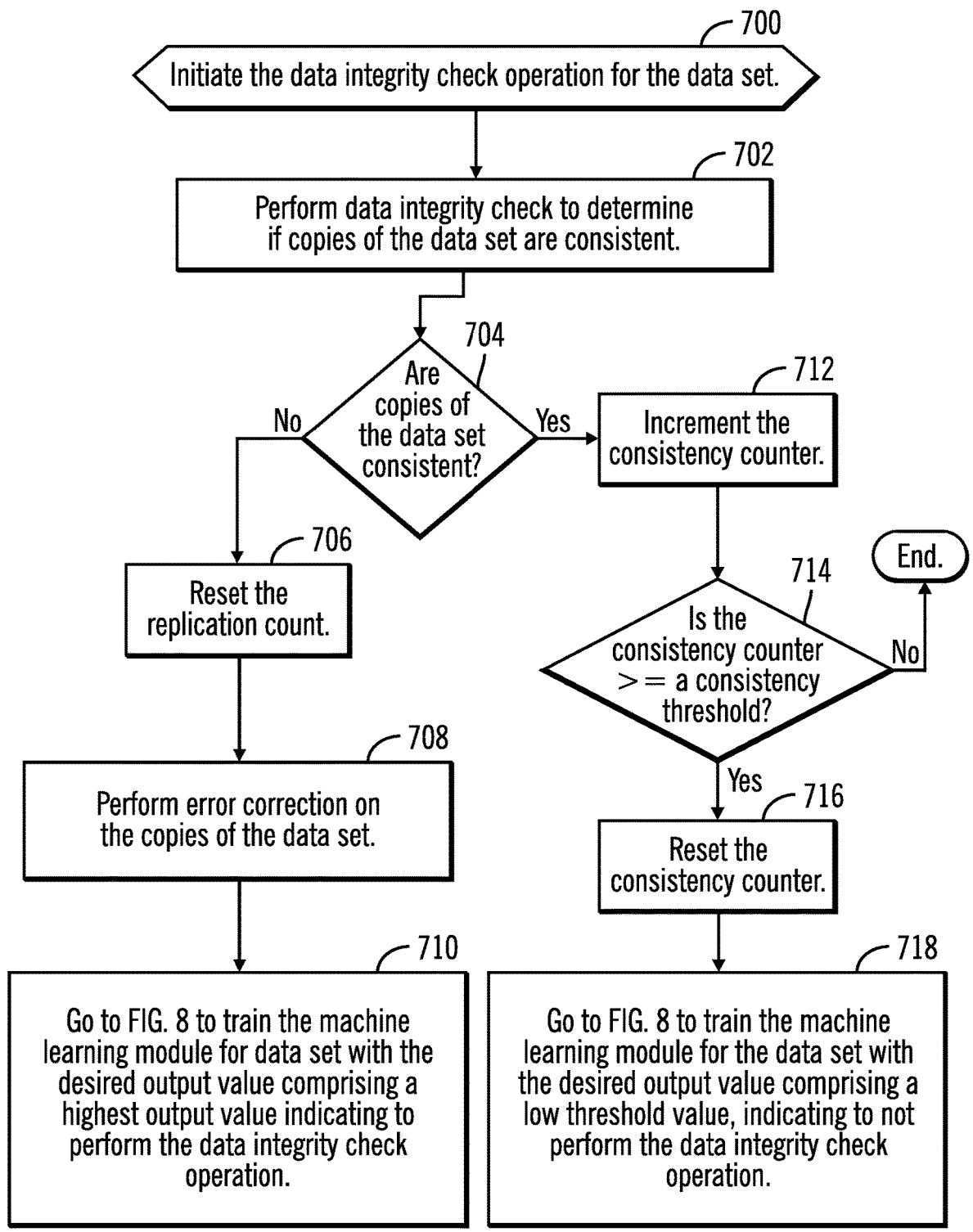
FIG. 7 illustrates an embodiment of operations to perform a data integrity check operation.

FIG. 7 illustrates an embodiment of data integrity check operations performed by the data integrity check module 120 that may be invoked at block 612 in FIG. 6 when the machine learning module 124 produces a high output value 126 and at block 614 in FIG. 6 if the replication count 402 exceeds the data integrity check frequency 404. Upon initiating (at block 700) data integrity check operations, a data integrity check is performed (at block 702) to determine whether the copies of the data set $116_1$ . . . $116_n$ are consistent, i.e., all match. If (at block 704) the copies of the data set $116_1$ . . . $116_n$ are not consistent, then the replication count 402 is reset (at block 706) and error correction is performed (at block 708) on one or more of the copies of the data set $116_1$ . . . $116_n$. In one embodiment, error correction may comprise performing a parity check operation to determine which of the copies of the data set $116_i$ are invalid based on the parity information $118_i$ for the copy $116_i$. For those copies $116_i$ not passing the parity check, the parity check information $118_i$ may be used to error correct the copy of the data set $116_i$. In an alternative embodiment, the error correction operation may comprise performing, for each replication copy of the data set $116_i$ not consistent with the primary copy of the system configuration data set $116_1$, copying the primary system configuration data set $116_1$ to the replication copy of the data set $116i$ not matching to correct any errors in the replication copy of the data set $116_i$ and make consistent with the primary system configuration data set $116_1$. In other embodiments, other techniques may be used to synchronize the copies of the data set $112_1$ . . . $112_n$.

After synchronizing the copies of the data set $116_1$ . . . $116_n$, through parity correction or copying over the primary copy of the data set $116_1$, control proceeds (at block 710) to FIG. 8 to train the machine learning module 124 for the data set with a desired output value comprising a highest output value indicating to perform the data integrity check, e.g., a desired output value of one.

If (at block 704) the copies of the data set $116_1$ . . . $116_n$ are consistent, then the consistency counter 408 is incremented (at block 712). A determination is made (at block 712) whether the consistency counter 408 is greater than or equal to the consistency threshold 410. If (at block 714) the consistency counter 408 exceeds the consistency threshold 410, i.e. there has been a threshold number of data integrity checks where no inconsistency was found in the copies of the data set $116_1$ . . . $116_n$, then the consistency counter 408 is reset (at block 717) and control proceeds (at block 718) to FIG. 8 to train the machine learning module 124 with the desired output value comprising a low threshold value, indicating to not perform the data integrity check, such as 0.001. If (at block 714) the consistency counter 408 does not exceed the consistency threshold 410, then control ends without retraining the machine learning module 124 to decrease the output value 126, because there have not been a sufficient number of data integrity checks not resulting in consistency problems to warrant adjusting the output value 126 downward.

With the embodiment of FIG. 7, after performing the data integrity check, the machine learning module 124 is trained to produce an output value indicating a high likelihood of data set inconsistency from the current operating conditions at the storage units $102_1$, $102_2$ . . . $102_n$ and system state transition information 210 to increase the likelihood that the machine learning module 124 can accurately predict when operating conditions indicate that the copies of the data set $116_1$ . . . $116_n$ are inconsistent. Likewise, if a data set inconsistency has not been detected after a predefined number of data integrity checks, then the machine learning module 124 is trained to produce an output value indicating a low likelihood of data set inconsistency based on the current operating conditions to increase the likelihood that the machine learning module 124 can accurately predict no data set inconsistency when similar operating conditions occur in the future.

Figure 8:
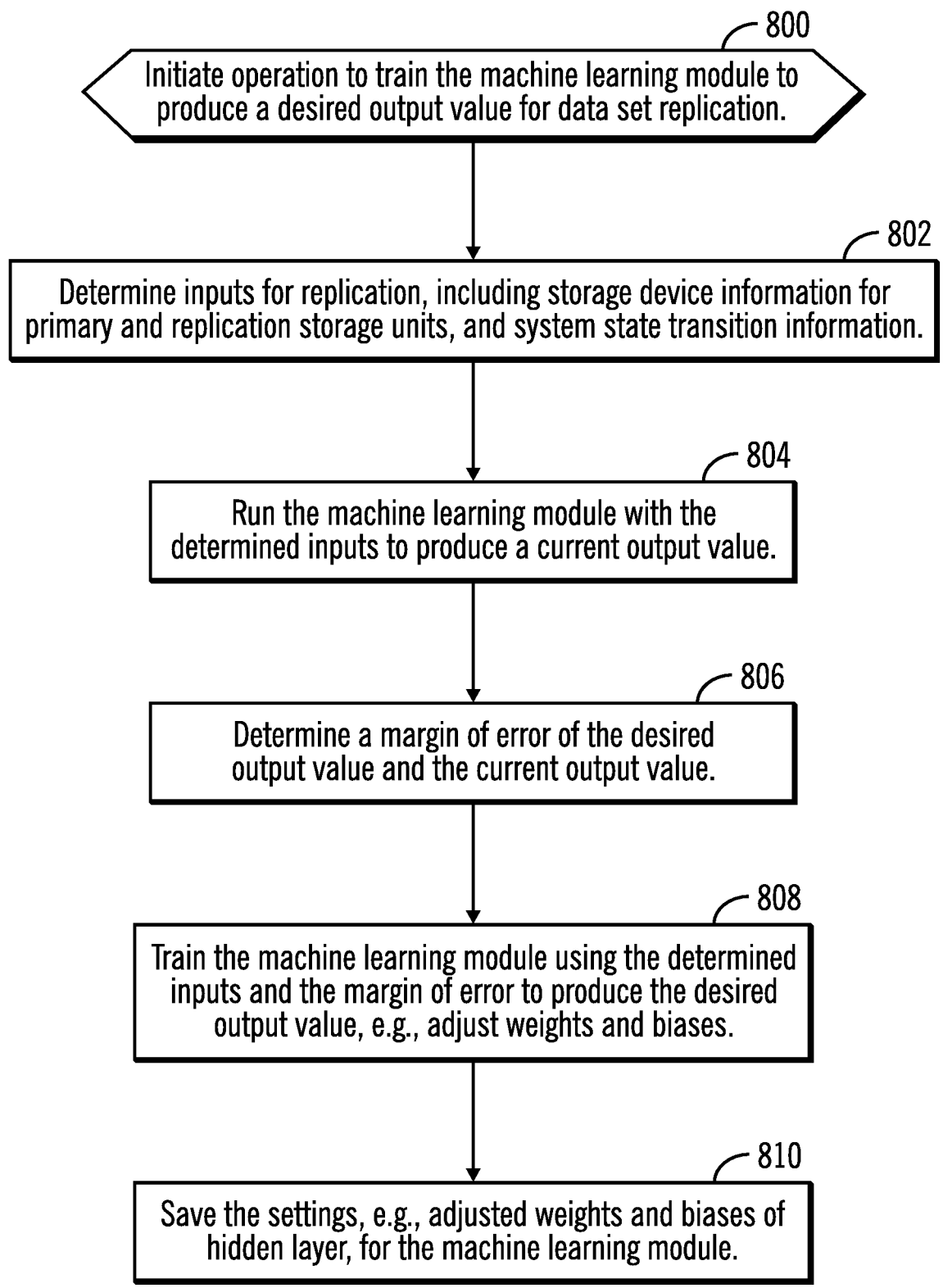
FIG. 8 illustrates an embodiment of operations to train the machine learning module to determine whether to perform a data integrity check.

FIG. 8 illustrates an embodiment of operations performed by the data integrity check module 120 and/or machine learning module 124 to retrain the machine learning module 124 to produce a desired output value, such as a higher or lower output value depending on whether a data set inconsistency has been detected (at block 704 in FIG. 8) or not detected a threshold number of times (from block 714 in FIG. 7). Upon initiating (at block 800) an operation to train the machine learning module 124 to produce a desired output value, a determination is made (at block 802) of the input 122 from the current storage device information $200_i$ for the one or more storage devices implementing the storage units $102_1$ . . . $102_n$ and the system state transition information 210. The machine learning module 124 is run (at block 804) with the determined input 122 to produce a current output value 126. A determination is made (at block 806) of a margin of error of the desired output value and the current output value 126. The machine learning module 124 is trained (at block 808) using the determined input 118 and the margin of error, and other information, to produce the desired output value. The machine learning module 124 may be trained using back propagation to reduce the margin of error, to produce the desired output value. In embodiments where the machine learning module 124 algorithm comprises an artificial neural network, a backward propagation routine may be used to retrain the machine learning module 124 to produce the desired output value 126. For other types of machine learning algorithms, such as Bayesian models, other techniques may be used to retrain the machine learning module 124 to produce the desired output value. The settings, e.g., adjusted weights and biases of the hidden layer of the machine learning module 124, are then saved (at block 810) for later us.

With the embodiment of FIG. 8, the machine learning module 124 is retrained to produce a desired output value that reflects the current likelihood of an error based on current attributes of the storage device(s) implementing the storage units $102_1$, $102_2$ ... $102_n$ to have the machine learning module 124 more accurately predict a likelihood of inconsistency at the copies of the data set $116_1$, $116_2$ ... $116_n$.

Figure 9:
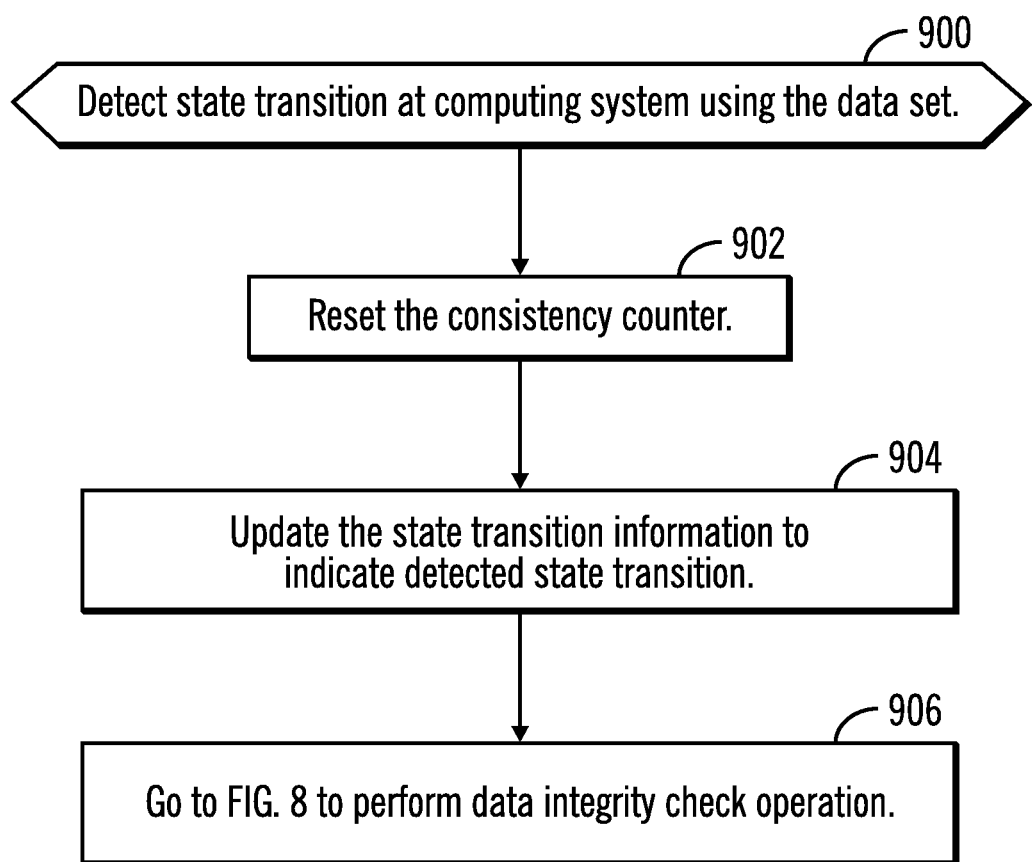
FIG. 9 illustrates an embodiment of operations to perform a data integrity check upon detecting a state transition.

FIG. 9 illustrates an embodiment of operations performed by the data integrity check module 120 and/or machine learning module 124 to handle a detected state transition at the computing system 100, such as a failback, failover, warmstart, power cycle event, etc. Upon detecting (at block 900) a state transition, the consistency counter 408 is reset (at block 902) and the state transition information 210 is updated (at block 904) to indicate the detected state transition. Control proceeds (at block 906) to FIG. 8 to perform a data integrity check to parity check the copies of the data set $116_1$, $116_2$ ... $116_n$ and correct errors, if any, using the parity information $118_1$, $118_2$ ... $118_n$, respectively.

With the embodiment of FIG. 9, a data integrity check is performed upon detecting a state transition to determine whether the copies of the data set need to be corrected and whether the machine learning module 124 needs to be retrained. In certain embodiments, only certain specified state transitions may trigger the operations of FIG. 9, such as for critical state transitions that can impact performance of the system 100.

In the embodiments of FIGS. 1-9, the machine learning module 124 determines a likelihood of a data set inconsistency in copies of the data set $116_1$, $116_2$ ... $116_n$ for a single computer system 100.

Figure 10:
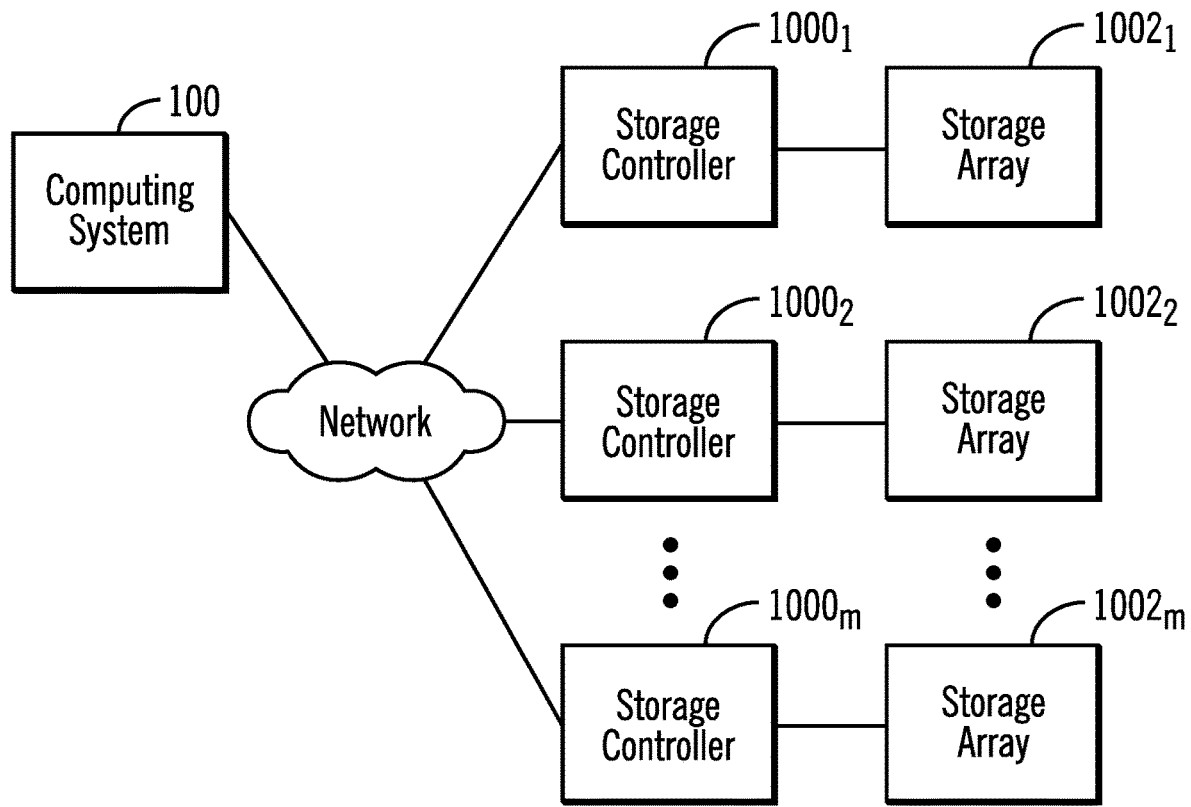
FIG. 10 illustrates an additional embodiment of a computing environment including a plurality of storage controllers.

FIG. 10 illustrates an additional embodiment where the computing system 100 described with respect to FIGS. 1-9 is in communication with a plurality of storage controllers $1000_1$, $1000_2$ ... $1000_m$ each managing access to a storage array $1002_1$, $1002_2$ ... $1002_m$ over a network 1004. The machine learning module 124 receives inputs from one or more storage controllers $1000_1$, $1000_2$ ... $1000_m$ to calculate an output value for the storage controller $1000_1$, $1000_2$ ... $1000_m$ to use to determine whether to initiate a data integrity check of the copies of the data set $116_1$, $116_2$ ... $116_n$, maintained by each $1000_1$, $1000_2$ ... $1000_m$ storage controller in their respective storage array $1002_1$, $1002_2$ ... $1002_m$, and error correction if needed. In this way, the machine learning module 124 may be more frequently and hence more accurate because it is trained from operational parameters in multiple storage controllers $1000_1$, $1000_2$ ... $1000_m$, each separately managing copies of a data set $116_1$, $116_2$ ... $116_n$. Although the machine learning module 124, data set replication information 200, storage device information 300 and data integrity check information 400 may be maintained in the computing system 100, the data integrity check module 120 may be maintained locally in each of the storage controllers $1000_1$, $1000_2$ ... $1000_m$ to parity check the copies of the data set $112_2$ ... $112_n$ for each storage controller $1000_i$. In this way, the computing system 100 provides a network service in providing output values that indicate whether a particular storage controller $1000_i$ needs to perform a data integrity check.

In the described embodiment, variables "i" and "n", etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIGS. 1 and 10, including the hosts 105, computing system 100, and storage controllers $1000_1$, $1000_2$ ... $1000_m$ may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

Figure 11:
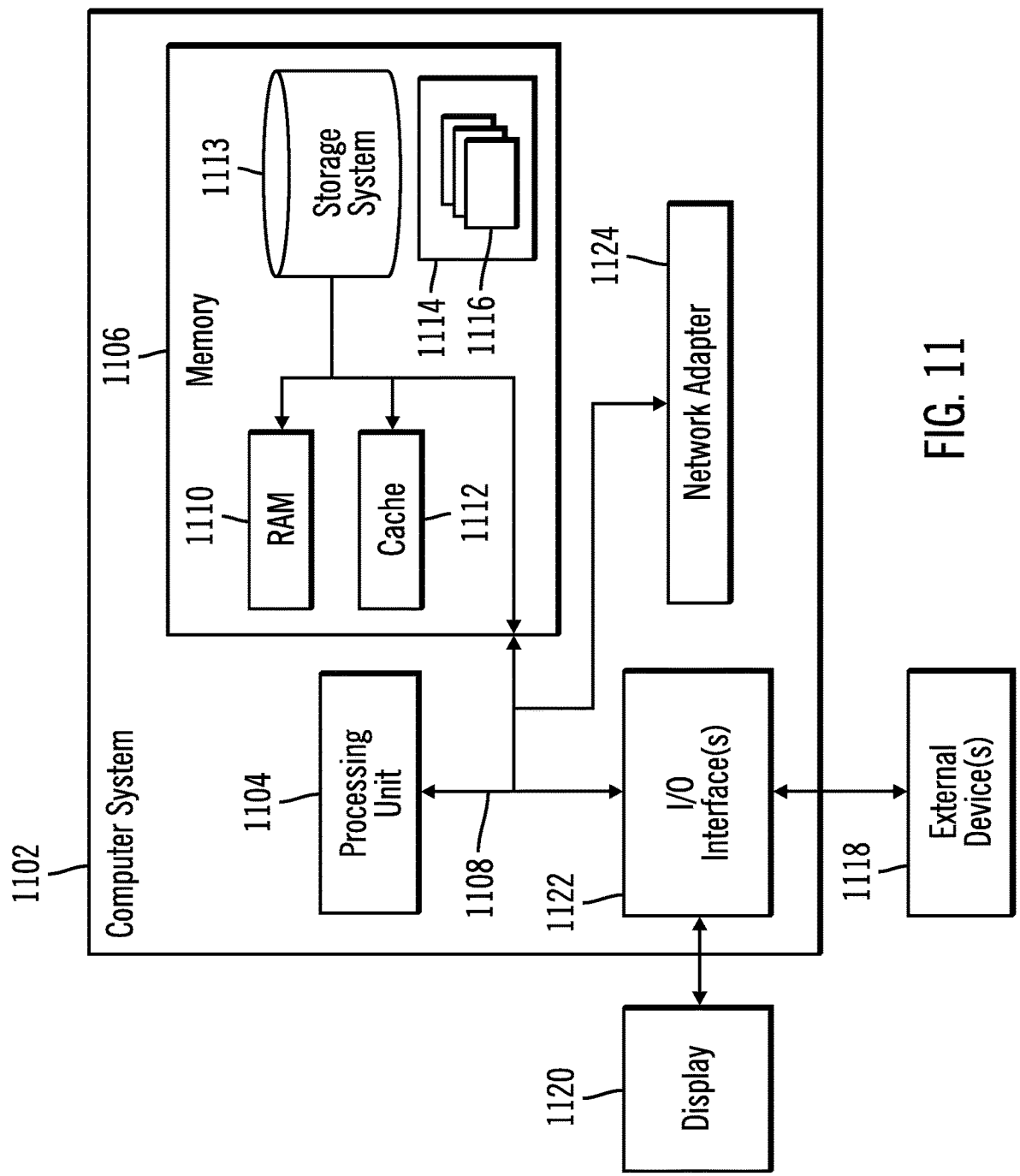
FIG. 11 illustrates a computing environment in which the components of FIGS. 1 and 10 may be implemented.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1116. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1160, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1162. Still yet, computer system/server 1102 can communicate with one or more networks such as a local area network (LAN), a general wide area network (WAN), and/or a public network (e.g., the Internet) via network adapter 1164. As depicted, network adapter 1164 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for checking data integrity of copies of a data set, the computer program product comprising a computer readable storage medium storing computer readable program code that when executed by a processor causes the processor to perform operations, the operations comprising:
   providing input on storage attributes of a plurality of storage units, each storage unit of the storage units storing a copy of a data set, to a machine learning module to produce an output value;
   determining whether the output value indicates to perform a data integrity check of the copies of the data set;
   determining whether the copies of the data set on different storage units are inconsistent in response to determining to perform the data integrity check; and
   performing error correction to correct at least one of the copies of the data set to synchronize all the copies of the data set in response to determining that the copies of the data are inconsistent.

2. The computer program product of claim 1, wherein the performing the error correction to correct the at least one of the copies of the data set to synchronize all the copies of the data set comprises performing one of:
   using parity information for each copy of the data set of the copies of the data set to perform a parity check of the copy of the data set and if the copy of the data set has errors, using the parity information to perform error correction of the copy of the data set; and
   for each copy of the data set comprising a replication copy of the data set of a primary copy of the data set, copying the primary copy of the data set to the replication copy of the data set if the replication copy of the data set does not match the primary copy of the data set.

3. The computer program product of claim 1, wherein each storage unit comprises a different rank in a Redundant Array of Independent Disks (RAID), wherein each rank of ranks includes a copy of the data set.

4. The computer program product of claim 1, wherein there are at least three storage units, wherein the data set comprises system configuration information, wherein a primary copy of the copies of the data set in one storage unit is currently being used to provide system configuration parameters to a system, wherein the operations further comprise:
   processing a write to the primary copy of the data set; and
   replicating the write to at least one additional copy of the data set in at least one additional storage unit.

5. The computer program product of claim 4, wherein the input on attributes of the storage units are provided to the machine learning module to determine whether to perform the data integrity check in response to at least one of:
   replicating the write to the at least one additional copy of the data set; and detecting a state transition at the system using the system configuration information in the data set.

6. The computer program product of claim 1, wherein the operations further comprise:
incrementing a replication count indicating a number of times a write has been replicated to at least one additional copy of the data set in response to replicating the data set to at least one additional storage unit;
determining whether the replication count satisfies a condition with respect to a data integrity check frequency, wherein the input of the storage attributes of the storage units are provided to the machine learning module in response to the replication count satisfying the condition with respect to the data integrity check frequency; and
resetting the replication count in response to the replication count satisfying the condition with respect to the data integrity check frequency.

7. The computer program product of claim 6, wherein the output value from the machine learning module comprises a number from zero to one indicating a likelihood that the copies of the data set are not consistent, wherein the determining whether the output value indicates to perform the data integrity check comprises:
not performing the data integrity check in response to the output value being less than a lower bound;
performing the data integrity check in response to the output value being greater than an upper bound; and
adjusting the data integrity check frequency based on the output value in response to the output value being between the lower bound and the upper bound.

8. The computer program product of claim 1, wherein the storage attributes of the storage unit used as the input to the machine learning module include at least two of:
state transition information at a system using the data set having information on a state transition resulting from an error event in at least one of the system and the storage units storing the copies of the data set;
a type of at least one storage device comprising the storage unit;
an age of the at least one storage device from first use;
a firmware level of the at least one storage device;
a read operations per second at the at least one storage device; and
a write operations per second at the at least one storage device.

9. The computer program product of claim 8, wherein the state transition information indicates at least one of a failure at a system using the data set, a failover or failback involving the system using the data set, an error in one of the storage units storing the copies of the data set, a power cycle or reset event at the system.

10. A system for checking data integrity of copies of a data set at storage units, comprising:
a processor; and
a computer readable storage medium storing computer readable program code that when executed by the processor performs operations, the operations comprising:
providing input on storage attributes of the storage units, each storage unit of the storage units storing a copy of a data set, to a machine learning module to produce an output value;
determining whether the output value indicates to perform a data integrity check of the copies of the data set;
determining whether the copies of the data set on different storage units are inconsistent in response to determining to perform the data integrity check; and
performing error correction to correct at least one of the copies of the data set to synchronize all the copies of the data set in response to determining that the copies of the data are inconsistent.

11. The system of claim 10, wherein the operations further comprise:
incrementing a replication count indicating a number of times a write has been replicated to at least one additional copy of the data set in response to replicating the data set to at least one additional storage unit;
determining whether the replication count satisfies a condition with respect to a data integrity check frequency, wherein the input of the storage attributes of the storage units are provided to the machine learning module in response to the replication count satisfying the condition with respect to the data integrity check frequency; and
resetting the replication count in response to the replication count satisfying the condition with respect to the data integrity check frequency.

12. The system of claim 11, wherein the output value from the machine learning module comprises a number from zero to one indicating a likelihood that the copies of the data set are not consistent, wherein the determining whether the output value indicates to perform the data integrity check comprises:
not performing the data integrity check in response to the output value being less than a lower bound;
performing the data integrity check in response to the output value being greater than an upper bound; and
adjusting the data integrity check frequency based on the output value in response to the output value being between the lower bound and the upper bound.

13. A method for checking data integrity of copies of a data set, comprising:
providing input on storage attributes of a plurality of storage units, each storage unit of the storage units storing a copy of a data set, to a machine learning module to produce an output value;
determining whether the output value indicates to perform a data integrity check of the copies of the data set;
determining whether the copies of the data set on different storage units are inconsistent in response to determining to perform the data integrity check; and
performing error correction to correct at least one of the copies of the data set to synchronize all the copies of the data set in response to determining that the copies of the data are inconsistent.

14. The method of claim 13, further comprising:
incrementing a replication count indicating a number of times a write has been replicated to at least one additional copy of the data set in response to replicating the data set to at least one additional storage unit;
determining whether the replication count satisfies a condition with respect to a data integrity check frequency, wherein the input of the storage attributes of the storage units are provided to the machine learning module in response to the replication count satisfying the condition with respect to the data integrity check frequency; and
resetting the replication count in response to the replication count satisfying the condition with respect to the data integrity check frequency.

15. The method of claim 14, wherein the output value from the machine learning module comprises a number from zero to one indicating a likelihood that the copies of the data set are not consistent, wherein the determining whether the output value indicates to perform the data integrity check comprises:
not performing the data integrity check in response to the output value being less than a lower bound;
performing the data integrity check in response to the output value being greater than an upper bound; and
adjusting the data integrity check frequency based on the output value in response to the output value being between the lower bound and the upper bound.

16. A computer program product for checking data integrity of copies of a data set, the computer program product comprising a computer readable storage medium storing computer readable program code that when executed by a processor causes the processor to perform operations, the operations comprising:
providing input on storage attributes of a plurality of storage units, wherein one storage unit stores a primary copy of the data set and at least one other storage unit stores at least one replication copy of the data set to which the primary copy is replicated, to a machine learning module to produce an output value indicating a likelihood that the primary copy and the at least one replication copy do not match;
determining whether the output value indicates to adjust a data integrity check frequency indicating a frequency at which a data integrity check is performed of the primary copy and the at least one replication copy of the data set;
adjusting the data integrity check frequency in response to determining that the output value indicates to adjust the data integrity check; and
performing the data integrity check based on a number of times the primary copy of the data set has been replicated to the at least one replication copy and the data integrity check frequency.

17. The computer program product of claim 16, wherein the operations further comprise:
determining whether the output value indicates to perform the data integrity check; and
performing the data integrity check to determine whether the primary copy and the at least one replication copy of the data set match in response to determining that the output value indicates to perform the data integrity check.

18. The computer program product of claim 17, wherein the operations further comprise:
determining whether the output value exceeds a first value, wherein the data integrity check is not performed in response to determining that the output value is less than the first value; and
determining whether the output value exceeds a second value greater than the first value in response to determining that the output value exceeds the first value, wherein the output value indicates to perform the data integrity check in response to the output value exceeding the second value, and wherein the output value indicates to adjust the data integrity check frequency in response to the output value being less than the second value and greater than the first value.

19. The computer program product of claim 16, wherein the adjusting the data integrity check frequency comprises dividing the data integrity check frequency by the output value to produce an adjusted data integrity check frequency to use to determine when to perform the data integrity check based on a number of replications of the primary copy of the data set to the at least one replication copy of the data set and the data integrity check frequency.

20. A system for checking data integrity of copies of a data set, comprising:
a processor; and
a computer readable storage medium storing computer readable program code that when executed by the processor performs operations, the operations comprising:
providing input on storage attributes of a plurality of storage units, wherein one storage unit stores a primary copy of the data set and at least one other storage unit stores at least one replication copy of the data set to which the primary copy is replicated, to a machine learning module to produce an output value indicating a likelihood that the primary copy and the at least one replication copy do not match;
determining whether the output value indicates to adjust a data integrity check frequency indicating a frequency at which a data integrity check is performed of the primary copy and the at least one replication copy of the data set;
adjusting the data integrity check frequency in response to determining that the output value indicates to adjust the data integrity check; and
performing the data integrity check based on a number of times the primary copy of the data set has been replicated to the at least one replication copy and the data integrity check frequency.

21. The system of claim 20, wherein the operations further comprise:
determining whether the output value indicates to perform the data integrity check; and
performing the data integrity check to determine whether the primary copy and the at least one replication copy of the data set match in response to determining that the output value indicates to perform the data integrity check.

22. The system of claim 21, wherein the operations further comprise:
determining whether the output value exceeds a first value, wherein the data integrity check is not performed in response to determining that the output value is less than the first value; and
determining whether the output value exceeds a second value greater than the first value in response to determining that the output value exceeds the first value, wherein the output value indicates to perform the data integrity check in response to the output value exceeding the second value, and wherein the output value indicates to adjust the data integrity check frequency in response to the output value being less than the second value and greater than the first value.

23. The system of claim 20, wherein the adjusting the data integrity check frequency comprises dividing the data integrity check frequency by the output value to produce an adjusted data integrity check frequency to use to determine when to perform the data integrity check based on a number of replications of the primary copy of the data set to the at least one replication copy of the data set and the data integrity check frequency.

24. A method for checking data integrity of copies of a data set, comprising:
providing input on storage attributes of a plurality of storage units, wherein one storage unit stores a primary copy of the data set and at least one other storage unit stores at least one replication copy of the data set to which the primary copy is replicated, to a machine learning module to produce an output value indicating a likelihood that the primary copy and the at least one replication copy do not match;

determining whether the output value indicates to adjust a data integrity check frequency indicating a frequency at which a data integrity check is performed of the primary copy and the at least one replication copy of the data set;

adjusting the data integrity check frequency in response to determining that the output value indicates to adjust the data integrity check; and performing the data integrity check based on a number of times the primary copy of the data set has been replicated to the at least one replication copy and the data integrity check frequency.

25. The method of claim 24, further comprising:

determining whether the output value indicates to perform the data integrity check; and performing the data integrity check to determine whether the primary copy and the at least one replication copy of the data set match in response to determining that the output value indicates to perform the data integrity check.

26. The method of claim 25, further comprising:

determining whether the output value exceeds a first value, wherein the data integrity check is not performed in response to determining that the output value is less than the first value; and determining whether the output value exceeds a second value greater than the first value in response to determining that the output value exceeds the first value, wherein the output value indicates to perform the data integrity check in response to the output value exceeding the second value, and wherein the output value indicates to adjust the data integrity check frequency in response to the output value being less than the second value and greater than the first value.

27. The method of claim 24, wherein the adjusting the data integrity check frequency comprises dividing the data integrity check frequency by the output value to produce an adjusted data integrity check frequency to use to determine when to perform the data integrity check based on a number of replications of the primary copy of the data set to the at least one replication copy of the data set and the data integrity check frequency.

* * * * *